United States Patent [19]

Blose

[11] Patent Number: 4,822,081

[45] Date of Patent: Apr. 18, 1989

[54] DRIVEABLE THREADED TUBULAR CONNECTION

[75] Inventor: Thomas L. Blose, Houston, Tex.

[73] Assignee: XL Systems, Beaumont, Tex.

[21] Appl. No.: 29,687

[22] Filed: Mar. 23, 1987

[51] Int. Cl.⁴ .............................................. F16L 15/00
[52] U.S. Cl. ..................................... 285/334; 285/355
[58] Field of Search ..................... 285/334, 355, 333

[56] References Cited

U.S. PATENT DOCUMENTS

| Re. 30,647 | 6/1981 | Blose | 285/332.2 |
|---|---|---|---|
| 1,474,375 | 11/1923 | Moore | |
| 1,932,427 | 10/1933 | Stone | 285/334 |
| 2,006,520 | 7/1935 | Stone et al. | 285/334 |
| 2,051,499 | 8/1936 | Siegle | 285/333 |
| 2,183,644 | 12/1939 | Frame | 285/334 |
| 2,196,966 | 4/1940 | Hammer | 285/333 |
| 2,239,942 | 4/1941 | Stone et al. | 285/334 |
| 2,258,066 | 10/1941 | Oyen | 285/334 |
| 2,543,100 | 2/1951 | Engh | |
| 3,079,181 | 2/1963 | Van Der Wissel | 285/333 |
| 3,224,799 | 12/1965 | Blose et al. | 285/334 |
| 3,359,013 | 12/1967 | Knox et al. | 285/334 |
| 4,113,290 | 9/1978 | Miida | 285/334 |
| 4,161,332 | 7/1979 | Blose | 285/334 |
| 4,192,533 | 3/1980 | Blose | 285/334 |
| 4,410,204 | 10/1983 | Reimert | 285/24 |
| 4,600,224 | 7/1986 | Blose | 285/334 |
| 4,600,225 | 7/1986 | Blose | 285/334 |
| 4,671,544 | 6/1987 | Ortloff | 285/334 |
| 4,703,954 | 11/1987 | Ortloff et al. | 285/334 X |
| 4,703,959 | 11/1987 | Reeves et al. | 285/332.3 |
| 4,707,001 | 11/1987 | Johnson | 285/334 X |

*Primary Examiner*—Thomas F. Callaghan
*Attorney, Agent, or Firm*—Arnold, White & Durkee

[57] ABSTRACT

A thread form for a tubular connection between sections of large diameter pipe or casing having a pin member adapted to be made up with a box member, utilizing converging, trapped thread flanks and mating shoulders and end faces with dissimilar angles. The thread crests and roots make contact with each other before the thread flanks are touching. At final make-up, the thread flanks of the pin member are trapped by the thread flanks of the box member. The stab flanks assist the shoulders/end faces in resisting axial compressive loading. The different angles between the mating shoulders and end faces are such that the deformation of the shoulders upon axial compressive loading is less than the preferred maximum yield of the critical area. The amount of load bearing forces on the shoulders and end faces are predictable and can easily be controlled within the preferred axial deformation of the critical area.

20 Claims, 3 Drawing Sheets

DRIVEABLE THREADED TUBULAR CONNECTION

BACKGROUND OF THE INVENTION

The present invention relates generally to a thread form for a pin and box connection of the type used in large diameter oil well tubing, casing and the like. More specifically, it relates to a driveable threaded joint having converging, trapped thread flanks, and having mating shoulders and end faces that help limit the deformation of the joint during axial compression.

DESCRIPTION OF THE RELATED ART

With oil and gas wells being drilled to greater depths and in a greater variety of geographic locations than ever before, there exists a need for tubular connections capable of performing their sealing function under a broad range of conditions and levels of operating stress and strain. There is a need for a connection in oil well service that will have mechanical integrity, and which will resist stresses or strains induced by tension, compression, internal pressure, external pressure, torsion, bending, thermal variances, or any combination of these.

The primary application of the present invention is to large diameter oil well pipe, i.e., pipe, tubing, conductor pipe, or casing, etc., having a diameter of approximately twenty inches or more. Frequently, an outer casing having a relatively large diameter is driven into the ground to a relatively shallow depth of, for example, 300 feet. It is common to use impact driving, i.e., pile driving, for large diameter casing, rather than drilling a large diameter hole beforehand and then running in the outer casing.

After the outer casing has been driven to a relatively shallow depth, one or more additional casings may be used inside the outer casing to reach a desired depth of several thousand feet or more. For example, after an outer casing having a thirty inch diameter is driven into the ground, a twenty inch diameter casing may be used to a depth of 2,000 feet followed by a 13⅜" diameter casing to a depth of 8,000 feet. Generally, the additional casing is run into the hole after the hole has been drilled sufficiently to accommodate the casing. The present invention has general application for connecting all large diameter casing, whether or not the casing is driven.

To reach the desired depth, a number of sections of pipe or casing are connected to one another. In the past, sections commonly have been connected to one another by either of two different methods. The first method involves welding directly together the two sections. The second method is a "weld-on" method, in which there are two mating threaded members, one threaded externally and the other threaded internally, one each welded to opposite ends of a length of pipe, and then the mating pieces are threaded to one another in joining two lengths of pipe. The direct welding method and the weld-on method are used to help maintain high structural integrity of the joint. It has not been economically practical to cut threads directly on a large diameter casing, and to thread sections of the casing together to make a drivable connection without a weld-on coupling.

One serious problem in using threads directly on large diameter pipe or casing, itself, is that the pipe or casing does not always hold a perfectly cylindrical shape. Instead, a large diameter casing will often flex into a somewhat oval, or out-of-round, shape. As a result, the threads may be very difficult to assemble and thereby adversely affect the performance capabilities of the joint.

Rather than risk the possible loss of performance properties, sections of large-diameter pipe or casing, as mentioned above, commonly have been welded directly together or weld-on couplings have been employed. However, the welding operations have significant disadvantages. One such disadvantage lies in the unproductive or underproductive time of the drilling rig when sections of casing are being welded together on the rig. Another disadvantage is resistance of the casing's outer surface to driving the casing into the ground. Since welded and weld-on joints are not flush with the outer circumference of the casing, the irregularities at the coupling areas on the casing's outer surface tend to hang-up during driving. Substantially more driving force, therefore, is required to drive casing having an irregular outer surface than to drive casing having a flush outer surface.

In the past, connectors threaded directly onto large diameter pipe or casing have not provided adequately high strength and resistance to stresses and strains. A major problem, for example, has been that threaded joints for large diameter casing have been unable to withstand axial driving forces without substantial deformation. For this reason, welded joints and weld-on couplings continue to be the preferred connections for large diameter casing.

The present invention represents a significant improvement over welded joints and weld-on couplings. It also is the first threaded coupling for large diameter casing that may be cut directly on the casing and can withstand high axial driving forces without sacrificing the integrity of the joint. Among the features of the present invention is a thread design having converging load and stab flanks.

Many years ago, the concept of a thread having converging load and stab flanks was devised to provide high torsional resistance in a threaded connection. This design also is known as a wedge-type thread. Although the terms "converging threads" and "wedge-type threads" are interchangeable, throughout this disclosure, the term "converging threads" is used. When converging threads are screwed together and wedging between the flanks takes place, the torsional resistance of the connection greatly increases. Further advance or make-up of the converging threaded flanks can then occur only if the material of the threads themselves yields due to the compressive or squeezing action of the load bearing faces of the threads.

In general, the pin and box threads in a converging thread flank connection have progressively changing axial widths. The axial thread width of the pin member progressively decreases in the direction of the mouth of the pin member over the length of the thread structure. The axial thread width of the box member, on the other hand, progressively decreases in the opposite direction, such that a pair of pin and box members in the fully made up condition have a mutually wedging interfit.

An early form of thread having converging thread flanks is described by R. S. Sperry in U.S. Pat. No. 2,488,566. This particular thread was designed for use on an extrusion pull rod. The same technology was later applied on a "Kinsley" timing screw which was used, for example, as a means of separating bottles on a conveyor for packing bottles or cans.

U.S. Pat. No. Re. 30,647 to Thomas L. Blose relates to a joint for oil well pipe generally having a diameter below twenty inches, which produces hoop tension in the pin member and hoop compression in the box member in response to forcible make-up of the members. In this instance the threads have a dovetail interfit. This dovetail interfit is also referred to as "trapped" thread flanks or negative angled flanks. The thread strain reactions against the load flank surface cause the box member to be pulled radially inward and the pin member to be pulled radially outward. The box member attains a condition of hoop compression while the pin member incurs hoop tension, and thereby provides a means of controlling induced assembly stresses in each member making the product applicable to sulphide environment in which high tensile stresses cause what is known as hydrogen embrittlement fracture. When the thread flanks first make contact, the thread crests and roots are not in contact. The hoop tension in the pin and hoop compression in the box are achieved by designing a clearance between each thread crest and the corresponding thread root. During make-up, the "trapped" thread flanks cause the box member to be pulled radially inward and the pin member to be pulled radially outward so that the thread crests and roots move toward one another.

In general, all conventional flush type tubular connections have an internal and an external shoulder which are generally used as torque shoulders to stop advancement in make-up. When utilizing converging thread flanks, however, the internal and external shoulders do not function as a torque stop. Instead, after contact of mating flanks and contact of the mating thread crests and roots during make-up, axial advancement of the pin member with respect to the box member from torque is stopped. Further advancement cannot take place without yielding the total thread flank area in contact.

In general, there is a critical area on each member which is smaller than the full area of the attached or integral pipe body. This critical area will yield in compression or tension before the full pipe body yields. In a converging thread design, this critical area is referred to as the thread relief groove or imperfect thread area. The area results from the inability to machine an engageable thread form up to and adjacent to a shoulder. Because of the thread relief groove having a smaller load bearing area, it is common to find tensile strengths for flush type connections which are well under 70% of that of the full pipe body. In fact, tensile strengths commonly vary from 40% to 70% of full pipe body. This feature also has deterred the application of flushtype, threaded connections in large diameter well pipe.

SUMMARY OF THE INVENTION

The present invention comprises a type of connection for large diameter oil well pipe that may be manufactured as part of the body of the pipe itself. The connection is an integral type connection in that a pin or a box, as the case may be, is integral with the full pipe body, rather than a welded or otherwise attached part. As such, the invention specifically addresses the problem of unproductive or underproductive time of a drilling rig during welding of pipe joints and pipe couplings. The connection of the present invention involves a thread design that may be manufactured as part of the casing itself so that sections of casing may be connected together at the drilling rig without welding. Additionally, the joint of the present invention is a flush joint. As explained earlier, a flush connection is better for driving into the ground since it avoids outer surface irregularities that hang-up during driving. Further, large diameter pipe is generally used only as surface casing and does not reach down into oil or gas producing zones. Therefore, it is not exposed to a sulphide environment and induced stresses from assembly are not of critical concern.

According to the present invention, sections of large diameter pipe may be threaded to one another without any welding operations. The invention provides a solid and strong connection that is capable of withstanding high stresses and strains. The present invention utilizes a converging thread design to control the position of the pin and box member at make-up. It also utilizes trapped threads, the stab flank having a nonpositive angle so that the stab flank is a load bearing surface during driving of the joint. Additionally, the present invention provides that the thread crests and thread roots of each member come into contact with one another before any contact of the thread flanks. The contact of the thread crests and roots prior to any contact of thread flanks helps to urge each member into a round, rather than out-of-round shape.

The present invention also utilizes mating shoulders and end faces having dissimilar angles. Preferably, a small area of the shoulder and mating end face are first contacted or are separated by a predetermined small distance on make-up of the thread flanks. When the converging thread flanks make contact, there is a narrow area of contact between the shoulders and end faces or there may be a relatively small gap between the two. Because of the available axial elastic/plastic yield of the critical areas—i.e., thread relief groove or imperfect thread area—the load bearing area between the shoulders and end faces increases as axial compressive forces increase and deformation progresses. The differences between the angles of the mating shoulders and end faces are such that the plastic deformation of the shoulder/end face caused by high axial compressive loading forces limits axial deformation in the thread relief groove. That is, the shoulders and end faces will deform, or "coin", until maximum contact area results, thus limiting the axial deformation of the relief groove. The dissimilar angles provide resistance to high axial compressive loadings such as occur during impact driving of large diameter casing into the ground. The resistance of the critical area to deformation increases as the area of the shoulders and end faces in contact increases.

A general aspect of this invention lies in controlling the make-up position of a converging thread connection such that the intended plastic deformation of the shoulders and end faces will control the elastic/plastic yield of the critical area of the joint. Since threads having converging flanks inherently do not move after the thread load and stab flanks become engaged during make-up, the amount of load bearing forces between the shoulders and end faces are predictable and can be easily controlled within the total allowable axial deformation of the critical area. The present invention allows high axial compression loading without inducing excessive deformation in those critical areas having smaller cross sectional area than the full pipe body.

These and other objects and advantages of the invention, as well as the details of illustrative embodiments, will be more fully understood from the following description and drawing.

DETAILED DESCRIPTION OF THE PREFERRED EMBODIMENT

Figure 1:
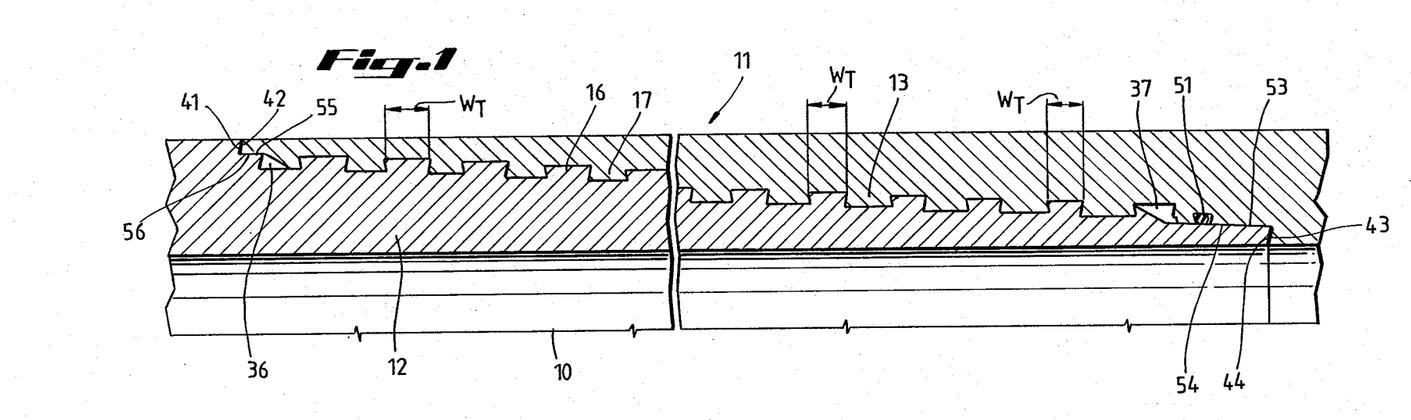
FIG. 1 is a section in an axial radial plane through a large diameter oil well pipe casing joint showing a preferred embodiment of the invention.

Referring to the drawing and especially FIG. 1 thereof, a tubular connection according to the present invention is shown with the box and pin members in a fully made up condition. FIG. 1 shows a tubular connection designated generally as 11 along axis 10. The connection 11 has a male or pin member 12 adapted to be made up with the female or box member 13 to form a threaded pipe or casing joint. By the term pipe is meant large diameter casing, tubing and pipe such as that used in the oil and gas well environment. In a preferred embodiment the tubular connection 11 has mating box and pin members having outside diameters and inside diameters identical for each of the two members. This is commonly referred to as a flush connection when assembled.

Still referring to FIG. 1, the tubular connection 11 includes pin member threads 16 which are adapted to be made-up with box member threads 17. Also shown in FIG. 1 are pin member shoulder 41, box member end face 42, box member shoulder 43, and pin member end face 44. The width of the thread $W_T$ also is shown at various axially spaced locations along the joint.

Figure 2:
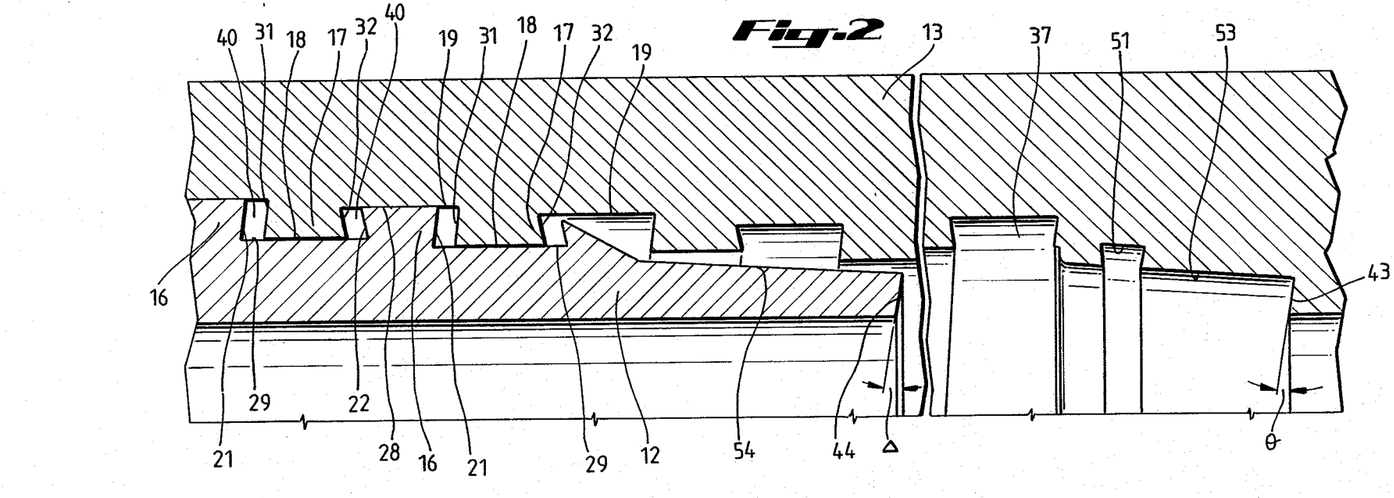
FIG. 2 is an enlarged view of threading of the box member shoulder and pin member end face prior to make-up according to the present invention in the FIG. 1 joint.

Now referring to FIG. 2, an enlarged portion of the joint according to FIG. 1 is shown before final make-up. The pin member 12 includes pin member threads 16 which have pin thread crests 28 and roots 29. The pin member threads also include stab flanks 21 and load flanks 22. The term stab flank refers to the side of the thread facing inwardly towards the joint, and the term load flank refers to the side of the thread facing away from the joint.

Also shown in FIG. 2 is box member 13. The box member includes box member threads 17 having box thread crests 18 and roots 19. Also shown are box member stab flanks 31 and load flanks 32.

According to the present invention, each thread has progressively reducing width $W_T$ along the helical length thereof. This is characteristic of a thread design having converging thread flanks. This is clear from FIG. 1 by comparing the widths $W_T$ of the thread at various axially spaced locations. At the same time, the thread pitch (the distance between the flanks in one turn) remains constant throughout the length of the thread. It is clear from FIGS. 2 and 3 that the threads have converging flanks which will limit make-up. Prior to complete make-up, i.e., in partially made up condition, there are gaps 40 between the thread flanks, as can be seen in FIG. 2. With the converging flank thread, both stab and load flanks gradually converge together during make-up and make contact upon final assembly, whereby axial advance of the pin member 12 with respect to the box member 13 is stopped. Further advancement cannot take place without yielding the total thread flank areas in contact.

As shown in FIG. 2, prior to complete make-up of the pin and box members, there are gaps between the threads of each member as shown at 40. When the joint is fully made up, the converging flanks of the thread provide a positive stop. The thread design also provides maximum attainable resistance to torque, tension, compression, or any other induced load condition when the joint is made up. The converging thread flanks thereby prevent the normal tendency of threads to bend or deflect under high axial load conditions which normally leads to possible pullout or joint separation.

Unlike many converging flank threads of the prior art, in the present invention the thread crests 18, 28 and roots 19, 29 of the pin and box members come into contact with one another before final make-up of the joint. In other words, the thread crests and roots contact each other before the thread flanks contact each other. It is preferred that the crests 18, 28 and roots 19, 29 come into contact before final make-up so that each of the sections of large diameter casing are mutually "rounded out" into a cylindrical (rather than oval) configuration before the thread stab flanks 21 and 31, and load flanks 22 and 32 are touching. Because the thread crests and roots contact each other before any contact of the thread flanks, the thread flanks do not impose any radial stresses on the joint. Additionally, it should be understood that contact of the thread crests and roots generally requires an interference between the box and pin members. That is, the diameter of the pin member at a thread crest should be greater than the diameter of the box member at the corresponding thread root. Because the members are initially in an out-of-round shape, however, the interference will initiate only in limited areas of the joint. It is also preferred that the thread crests and roots are parallel to the axis 10 of the casing.

Figure 3:
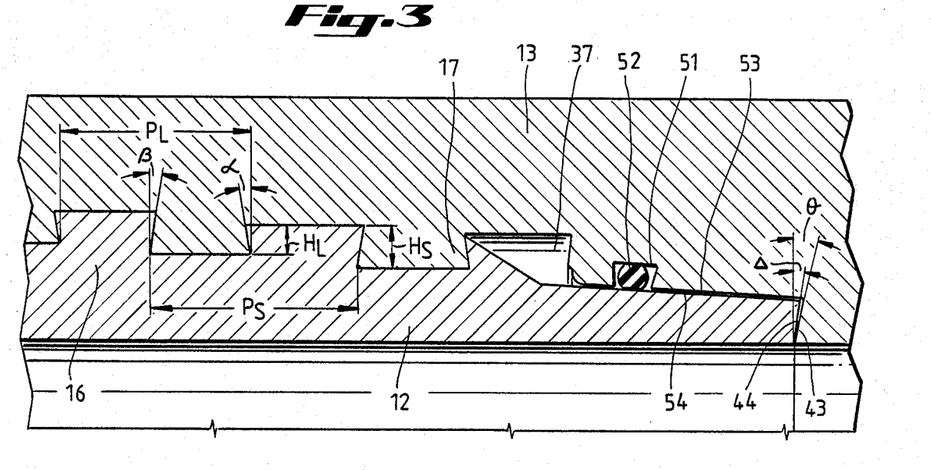
FIG. 3 is an enlarged view showing threading of the pin member end face and the box member shoulder after make-up in the FIG. 1 joint.
Figure 4:
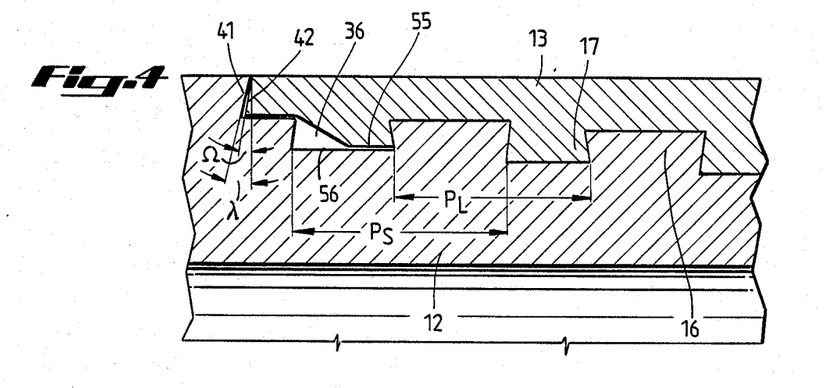
FIG. 4 is an enlarged view of threading showing the pin member shoulder and box member end face after make-up in the FIG. 1 joint.

It will be noted in a preferred embodiment of the present invention that the stab flanks, as well as the load flanks, each have constant thread pitch. As shown in FIG. 3 and FIG. 4, inherent in a converging thread flank design having constant thread pitch is that the stab flank pitch $P_S$ for each successive turn of the thread differs from the load flank pitch $P_L$ for that turn.

Throughout the length of the thread, $P_S$ and $P_L$ each remain constant, but $P_L$ differs from $P_S$.

It also will be noted that the height $H_S$ of the stab flank differs from the height $H_L$ of the load flank. The respective heights remain constant throughout the length of the helical thread. The difference between the stab flank height $H_S$ and load flank height $H_L$ is inherent in a tapered flush-type connection having cylindrical thread crests and roots. The height differential results in the connection having greater axial compressive strength than axial tensile strength. This is due to the greater load bearing area of the stab flanks 21 and 31 than the load bearing area of the load flanks 22 and 32.

With the present invention, the threads may be tapered in two or more steps, in order to reduce the total length of the threaded joint. A shoulder and mating end face are used between each set of tapered threads.

As shown in FIG. 3, the stab flank angle $\beta$, measured from the perpendicular to the axis of the joint, is preferably between 0° and about 15°. This is referred to as a nonpositive angle, or, if the angle is greater than 0°, a ptrapped? flank. If the angle is 0°, this is a "square" or radially-directed thread flank. A "trapped" flank also is known as a "hooked" thread—in other words, the thread crest extends over the thread root. A nonpositive angled stab flank helps ensure that the threads do not slip out and become disengaged during axial driving of the casing. The nonpositive stab flank helps to support axial compressive loads. The applied axial compressive loads are supported by the stab flank as well as the shoulders of the connection. The nonpositive angled stab flank thereby inhibits separation of the pin and box members due to axial loading. As an alternative way of measuring the stab flank angle, the angle between the stab flank and the joint axis, measured in the direction of the pin end face, is preferably between 75° and 90°.

As shown in FIG. 3, the load flank is "trapped", and preferably the angle $\alpha$ of the trapped load flank is between about 3° and about 20° measured from the perpendicular to the joint axis. The trapped (or hooked) load flank helps prevent separation of the pin member 12 from the box member 13 during axial loading in tension. As an alternative measurement, the angle between the load flank and the joint axis, measured in the direction of the box end face, is preferably less than 90°, and most preferably between 87° and 70°.

It is preferred that the trapped stab flanks and load flanks be at a small enough angle, with respect to the perpendicular to the joint axis, to allow contact between the thread crests 18, 28 and roots 19, 29 without any interference or contact between the flanks before final make-up. It has been found that if angle of either the stab or load flank is too great, the flanks come into contact with one another before the thread crests are in contact with the thread roots. In one embodiment, the stab flank angle is about 10° and the load flank angle is about 15°.

As mentioned above, the joint is designed so that there is an interference between the corresponding thread crests and thread roots, so that each member is urged into a round (rather than an oval) shape. When the thread flanks of the present invention are finally touching, this is referred to as the fully made-up condition. Since the flanks of the threads do not touch until final make-up, the flanks do not impose any radial stresses on the pin and box members. Instead, because of the intereference between the mating thread crests and thread roots, the pin member is in a condition of hoop compression while the box member is in hoop tension. This should be contrasted with the prior art, which utilizes trapped thread flanks for obtaining hoop tension in the pin member and hoop compression in the box member. In the prior art, there was a clearance designed between the mating thread crests and roots. Therefore, in the prior art, the flanks make contact first, and as torque is applied, the crests and roots are urged toward each other.

It further will be understood that the present invention is not restricted to planar thread flanks. In fact, it is within the intended scope of this invention to include thread flanks of various surfaces—i.e., V-shaped, concave, etc. This is made possible because the thread flanks do not slide against one another. In fact, the thread flanks do not make contact until final make-up of the joint.

FIG. 3 shows a seal groove 51 proximate the box shoulder 43. The seal groove may be used to contain an elastomer ring 52 or metal seal to seal the box and pin members from leakage. The annular end region 54 of the pin member also seals against the annular shoulder region 53 of the box member, while the annular end region 55 of the box member seals against the annular shoulder region 56 of the pin member.

As shown in FIG. 4, the angle $\lambda$ of the pin shoulder 41 is different than the angle $\Omega$ of the box end face 42. Similarly, as shown in FIGS. 2 and 3, the box shoulder angle $\theta$ is different than the angle $\Delta$ of the pin end face 44. The angle of each is dependent on a variety of factors, including the type of material used, the thickness of the casing, and the axial loading. It is preferred that the angles of the shoulders and end faces be such that the end face is "trapped" by the shoulder, thereby avoiding slippage and disengagement during compressive loading. The trapped end face is preferred so that the joint is driveable. It is preferred that the differential between the angles of the shoulders and end faces be between 0° and about 10°. In a preferred embodiment, for casing having a 30 inch outer diameter and one inch wall thickness, the box end face angle $\Omega$ should be about 2° less than the pin shoulder angle $\lambda$. Similarly, in a preferred embodiment the pin end face angle $\Delta$ should be about 2° less than box shoulder angle $\theta$.

Preferably, when the joint is initially made up, each end face 42, 44 has a limited load bearing area against its mating shoulder 41, 43. Then, because of the available axial elastic yield of the critical area of the joint, such as thread relief grooves 36 and 37 during driving of casing, the load bearing area of the shoulders and end faces increases as axial compressive deformation progresses. The shoulders and end faces assist the stab flanks of the threaded elements in resisting applied axial compressive loads. This performance differs from the performance of conventional parallel type thread flank elements on connections utilizing torque shoulders. In the present invention, the combined area of the stab flanks and the shoulders will offer more load bearing area for axial compression forces than the area of the full pipe body. It has been estimated that the stab flank area in a preferred embodiment is about 200% of the pipe body area.

If the stab flanks were at a positive angle rather than a nonpositive angle, high axial compressive loading would be supported only by the shoulder and end face of each member. In that case, without the axial support of stab flanks, the shoulders and end faces would yield before the pipe body because the area of the shoulders and end faces is smaller than the pipe body. According to the present invention, however, the nonpositive angled stab flanks assist the shoulders and end faces to provide a greater load bearing area than the full pipe body. The critical area—i.e., thread relief groove—will yield because it is smaller in load bearing area than the area of the stab flanks and shoulders/end faces.

It will be understood that the critical area is that area of the pipe joint that has the smallest cross-sectional area, and thus is the area most subject to yielding upon the application of compressive or tensile axial loading. The present invention is not intended to be restricted to limiting deformation of a thread relief groove or imperfect thread area, but rather extends to limiting deformation of any critical area of the pipe joint, that critical area being weaker than the full pipe body.

The differences of the angles between the shoulders and end faces are such that the plastic deformation caused by axial compressive forces will result in elastic/plastic deformation in the critical area which is limited by the plastic deformation to cause full shoulder/end face contact.

The mating shoulders 41 and 43 and end faces 42 and 44 become deformed after making contact upon application of high axial compressive loading—e.g., driving forces. The different angles in the shoulders and end faces thereby limit elastic deformation of the critical area—i.e., thread relief grooves 36 and 37. The thread relief grooves 36 and 37 may only yield until the full load bearing areas of the shoulders and end faces are in contact. The threads themselves will not deform during loading, but the shoulders may coin unelastically during driving of the casing, for example. Because of the restricted amount of yield allowed for the thread relief grooves 36 and 37, not to exceed about 5% of the strain from axial compressive loading in a preferred embodiment, the pipe joint will be able to withstand subsequent tensile loading with greatly reduced risk of yielding.

It will be understood that if the shoulders and end faces are not touching upon make-up, the critical area is subject to yielding without the benefit of the load bearing area of the shoulders/end faces. Then, after the shoulders and end faces make contact, the load bearing area, and thus the resistance to deformation of the critical area, increases as increased axial compressive force is applied. As the shoulders and end faces are forced together, the angle separating the two is reduced or eliminated.

To control the extent of deformation of the thread relief groove, it is important that the mating shoulders and end faces, when the wedge threads are fully made up, are just touching or are separated only by a small distance. In the case of 30 inch casing with end face and shoulder angles of 8° and 10°, respectively, the allowable separation between the end faces and shoulders upon complete thread make-up is about 0.020 inches. In other words, as shown in FIG. 3 and FIG. 4, the converging thread flanks of both the pin and box member should be designed so that when the flanks make contact upon final makeup, the mating shoulders and end faces have only a narrow strip of contact surrounding the joint or are separated by such an amount that the amount of compressive yield required of the critical areas to close the gap and subsequently coin the shoulders and end faces will not be great enough to significantly affect the tensile strength in the critical areas. When axial compressive force then is applied, the shoulders begin to coin, while the critical areas yield. By limiting the yield of the critical areas during compressive loading, the joint is better able to withstand subsequent tensile loading.

According to the present invention, the converging thread flanks finally make contact with one another as the shoulders and end faces are just touching at the outer edges of the shoulders and end faces. If the shoulders and end faces touched before the thread flanks fully closed, the make-up torque would coin the shoulder and/or end faces somewhat. If dissimilar angles were not used, it would be extremely difficult and impractical to achieve full shoulder/end face contact upon makeup of the converging thread flanks. Although the shoulders and end faces may be allowed to contact before complete thread make-up, this is not the preferred condition. In that case, coining of the shoulders and end faces will result from thread make-up and the maximum compressive yield in the relief groove will be less than if the shoulders and end faces had just touched.

The present invention, in order to achieve the desired result, contemplates proper location of the shoulders and end faces with respect to the thread. That is, it is critical, within tolerances, to properly locate the shoulders and end faces of the pin and box members in relation to the varying width of the converging flank thread. This may be accomplished by machining the shoulders and end faces with respect to a reference point on the thread—e.g., where the thread is of a reference width. Alternatively, the machining of the thread may commence using the shoulder or end face location as a reference.

Figure 5A:
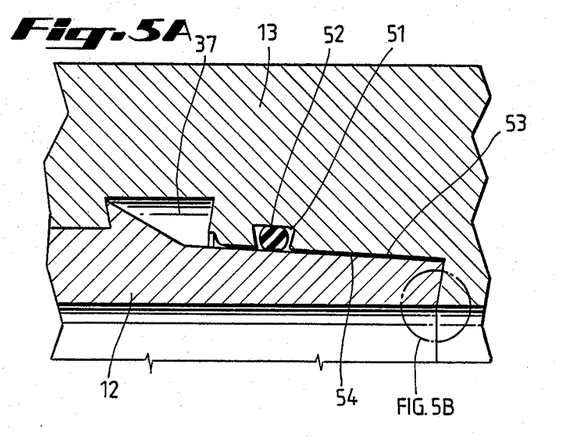
FIG. 5A is an enlarged view of threading showing the box member shoulder and pin member end face in the FIG. 1 joint after high axial compressive forces have been applied to the joint.
Figure 5B:
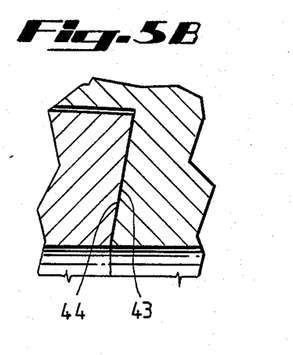
FIG. 5B is a further enlarged view of the box member shoulder and pin member end face after high axial compressive forces have been applied to the casing.
Figure 6:
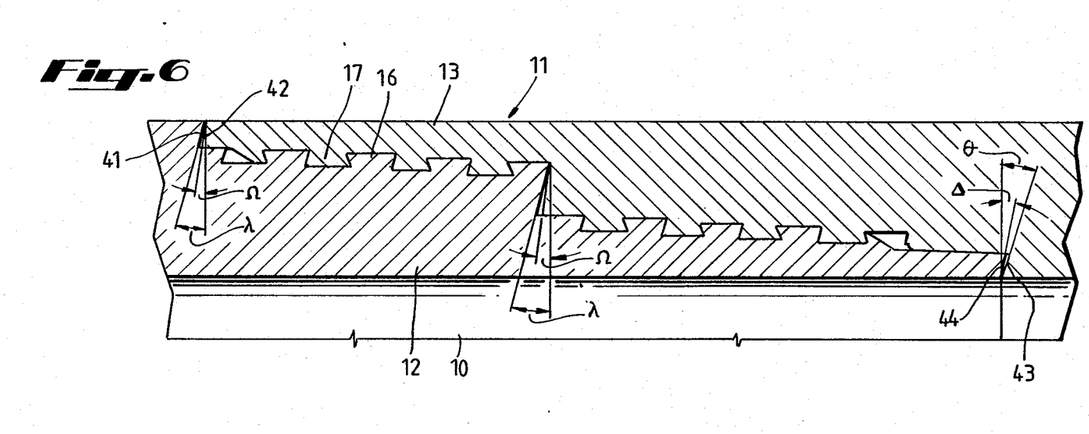
FIG. 6 is a section in an axial radial plane through a large diameter oil well pipe casing joint showing a second embodiment of the invention wherein the threads are multiple-step having a mating end face and shoulder located between the step.
Figure 7:
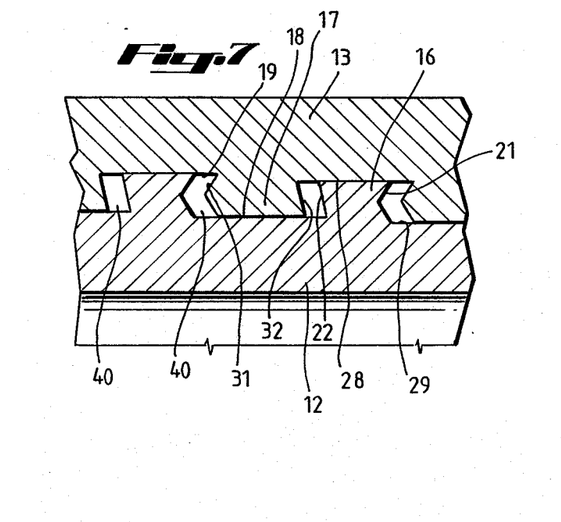
FIG. 7. is an enlarged view of threading showing an embodiment of the invention wherein the thread stab flanks have a V-shaped cross-section.
Figure 8:
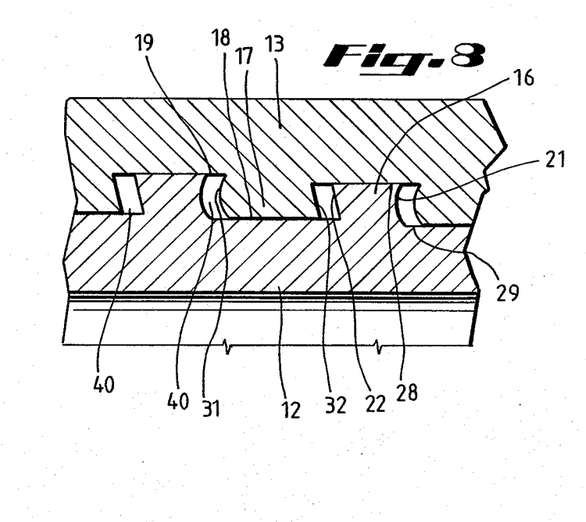
FIG. 8. is an enlarged view of threading showing an embodiment of the invention wherein the thread stable flanks have a curved cross-section.

After axial compressive force has been applied to the joint, the angle between the shoulder and end face will be reduced or eliminated. The unelastic deformation causes the mating shoulder and end face to have a full load bearing area of contact, as shown in FIG. 5A and FIG. 5B. Because the end face is trapped by the shoulder, the end face of the box member will not slip out upon the application of axial driving force. When tensile force is subsequently applied to the joint, the shoulder separates from the end face as the critical area yields.

Although variations in the embodiment of the present invention may not each realize all the advantages of the invention, certain features may become more important than others in various applications of the device. The invention, accordingly, should be understood to be limited only by the scope of the appended claims.

What is claimed is:

1. In a flush pipe joint, including integral pin and box members having a common axis,
   mating shoulders and end faces on said members;
   mating threads on said members, the threaded portion extending between the shoulder and end face of each member, the thread on each member having progressively changing axial width with the axial thread width of the pin member progressively decreasing toward the end face of the pin member over the length of the thread;
   said threads of the pin member being trapped by the threads of the box member in the fully made-up condition;
   said threads having crests and roots, the crests making contact with the roots prior to reaching the fully made-up condition; and
   the area of contact between the shoulders and end faces configured to increase when axial compressive force is applied to the joint.

2. The joint of claim 1 wherein said end faces are trapped by said shoulders.

3. The joint of claim 1 wherein said threads include a stab flank angled nonpositively relative to a plane normal to said axis, and a load flank angled negatively relative to the plane normal to said axis, said stab flank and load flank having different angles.

4. The joint of claim 1 further including a critical area having a smaller cross-sectional area than the full pipe body, the deformation of the critical area being limited by the available deformation of the shoulders and end faces.

5. The joint of claim 1 wherein said threads include a stab flank and a load flank, and wherein the thread pitch between successive stab flanks is constant throughout the length of the joint and the thread pitch between corresponding load flanks is constant throughout the length of the joint, the stab flank pitch and the load flank pitch being different.

6. The joint of claim 1 wherein the thread contact area resistive to axial compressive loads is greater than the thread contact area resistive to axial tensile loads.

7. The joint of claim 1 wherein said threads include stab flanks and load flanks, the angle between the stab flank and the joint axis in the direction of the pin end face being 90° or less, and the angle between the load flank and the joint axis in the direction of the box end face being less than 90°.

8. The joint of claim 1 wherein said threads are multiple-step, and wherein a mating end face and shoulder is located between each step.

9. The joint of claim 1 wherein said threads include stab flanks and load flanks, the flanks being V-shaped in cross-section.

10. The joint of claim 1 wherein said threads include stab flanks and load flanks, the flanks being curved in cross-section.

11. The joint of claim 1 wherein the pin member is subject to hoop compression and the box member is subject to hoop tension.

12. A flush-type pipe joint for connecting two pipe bodies, which comprises:
a pin member and a box member each integral with a separate one of the pipe bodies, and having mating, converging, threads with roots, crests, nonpositive angled stab flanks, and nonpositive angled load flanks configured such that contact between mating roots and crests occurs prior to contact between mating flanks;
the pin member and the box member also having mating shoulders and end faces configured to contact no sooner than contact between the mating flanks upon make-up of the pin member and the box member;
the pin member and the box member each having a separate zone between its respective shoulder or end face and its threads which is weaker than its attached full pipe body; and
each said shoulder configured to trap its respective mating end face.

13. A tapered thread form for a flush tubular connection of the type having a pin member adapted to be made up with a box member to form a pipe joint, comprising:
a pin member having pin threads with thread crests and thread roots which are adapted to be made up with a mating box member having a complementary thread structure, said pin thread crests being formed between a stab flank and a load flank of said pin thread;
wherein the thread crests of the pin member make contact with the thread roots of the box member prior to any contact between the stab flanks or load flanks;
wherein said pin thread stab flank forms an angle of 90° or less with respect to the longitudinal axis of the connection, said angle measured in the direction of the pin end face;
wherein said pin thread load flank forms an angle less than 90° with respect to the longitudinal axis of the connection, said angle measured in the direction of the box end face;
wherein said pin and box threads have progressively changing axial width, said axial thread width progressively decreasing toward one end of said pin member over the length of said thread, wherein the threads of said pin and box members in the fully made up condition converge against one another to limit the axial make up of said joint;
said box and pin members having shoulders and end faces; the box member shoulder forming an angle theta with a plane perpendicular to the longitudinal axis of the tubular connection; the end face of the pin member forming an angle delta with a plane perpendicular to the longitudinal axis of the tubular connection; wherein the angle theta differs from the angle delta; and wherein said end face is trapped by said shoulder; and
wherein the contact area between the mating pin member shoulder and box member end face increases when axial driving force is applied to the joint.

14. The thread form of claim 13 further including a seal groove proximate said shoulder of the box member.

15. The thread form of claim 13 wherein the outer diameter of the pin member measured at the thread crests is greater than the inner diameter of the root member measured at the thread roots, and wherein upon make-up the pin member is in hoop compression and the box member is in hoop tension.

16. A driveable threaded casing joint, comprising:
a threaded pin member having an end face and an external shoulder, with a helical thread therebetween;
a threaded box member having an end face and an internal shoulder, with a helical thread therebetween, the box member thread configured to mate with the pin member thread;
wherein the pin member thread and the box member thread each include converging stab flanks and load flanks to form crests and roots which are parallel to the longitudinal axis of the joint, the width of the crest continuously decreasing from the pin member shoulder to the pin member end face; and
wherein the end faces of the pin member and the box member form an angle delta with a plane perpendicular to the longitudinal axis of the joint, and wherein the shoulders of the pin member and the box member form an angle theta with a plane perpendicular to the longitudinal axis of the joint; and
wherein, upon threaded engagement of the pin member and the box member, the thread crests and roots engage before the stab flanks and load flanks engage, the make-up of the joint being limited by the mutual engagement of the stab flanks and load flanks; and wherein, upon threaded make-up of the joint, non-engaged thread sections are located adjacent the end faces and shoulders; and wherein the angles delta and theta differ to predictably limit the compressive yield in the non-engaged thread sections when the joint is subjected to compressive load.

17. The casing joint of claim 16, wherein the pin member and box member each have a diameter of about 30 inches, the shoulders form an angle of about 10° with a plane perpendicular to the axis of the joint, the end faces form an angle of about 8° with a plane perpendicular to the joint axis, the stab flank angle is about 10° and the load flank angle is about 15°, the load and stab flank being measured with respect to a plane perpendicular to the joint axis.

18. The casing joint of claim 16, wherein the maximum compressive yield in the non-engaged thread sections is less than 5°.

19. In a pipe joint including pin and box members, the joint having an axis, annular shoulder and end regions on the members having sealing interfit; and first and second interengaged threads on the respective members, the threads having dovetail interfit and locking the members together against relative separation proximate one axial side of said annular shoulder region, each thread having progressively changing axial width along substantially the entire helical length thereof at selected radial distance from said axis, whereby the pin member is under hoop compression and the box member is under hoop tension.

20. A thread and seal structure for a pin member adapted for use in a pipe joint, said pin member having an axis and adapted to be made-up with a mating box member having a complementary thread structure to form the joint, said thread and seal structure for said pin member comprising:

an annular seal shoulder region formed on said pin member adapted for sealing interfit with such box member upon make-up of the joint;

a first helical pin thread structure on said pin member adapted for interengagement with a complementary helical thread structure on such box member upon make-up of the joint;

said first pin thread structure having a flank adapted to have a dove-tail interfit with such thread flank on such box member for locking the pin member and box member together against relative separation proximate one axial side of said annular seal shoulder region upon make-up of the joint; and said first pin thread structure having progressively changing axial width along substantially the entire helical length thereof at selected radial distance from the axis wherein the thread crests and roots produce forces tending to cause hoop compression in the pin member and hoop tension in the box member.

* * * * *